United States Patent Office 3,052,488
Patented Sept. 4, 1962

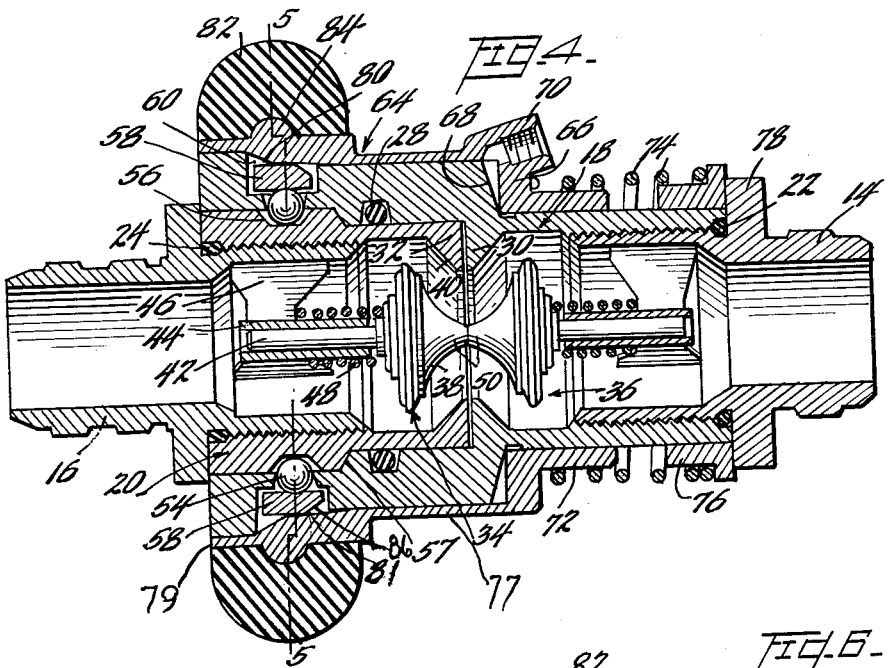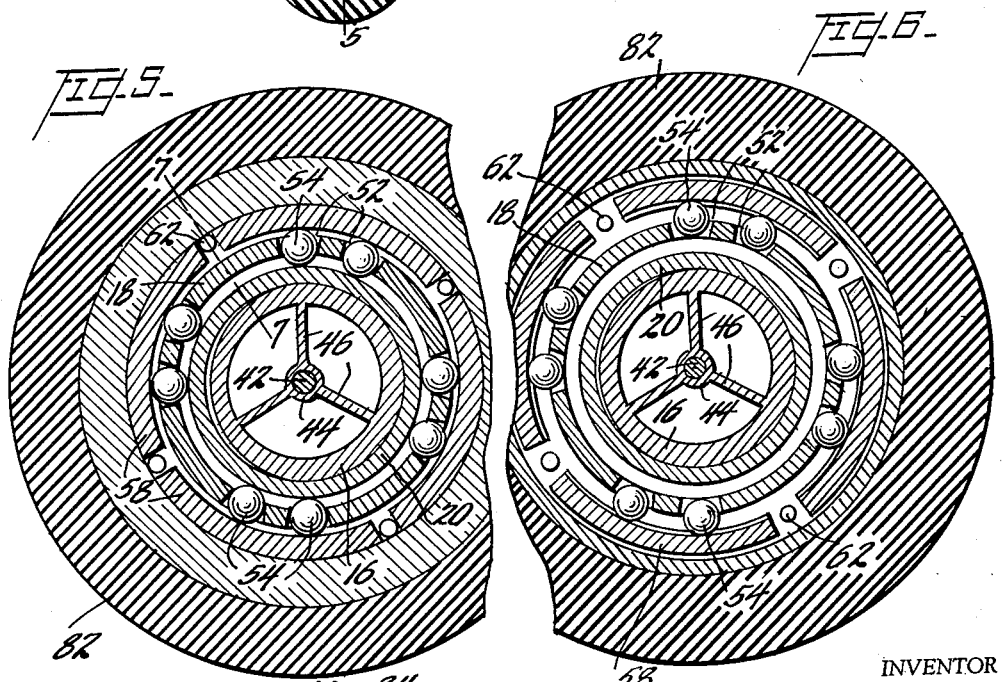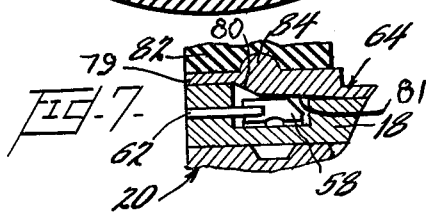

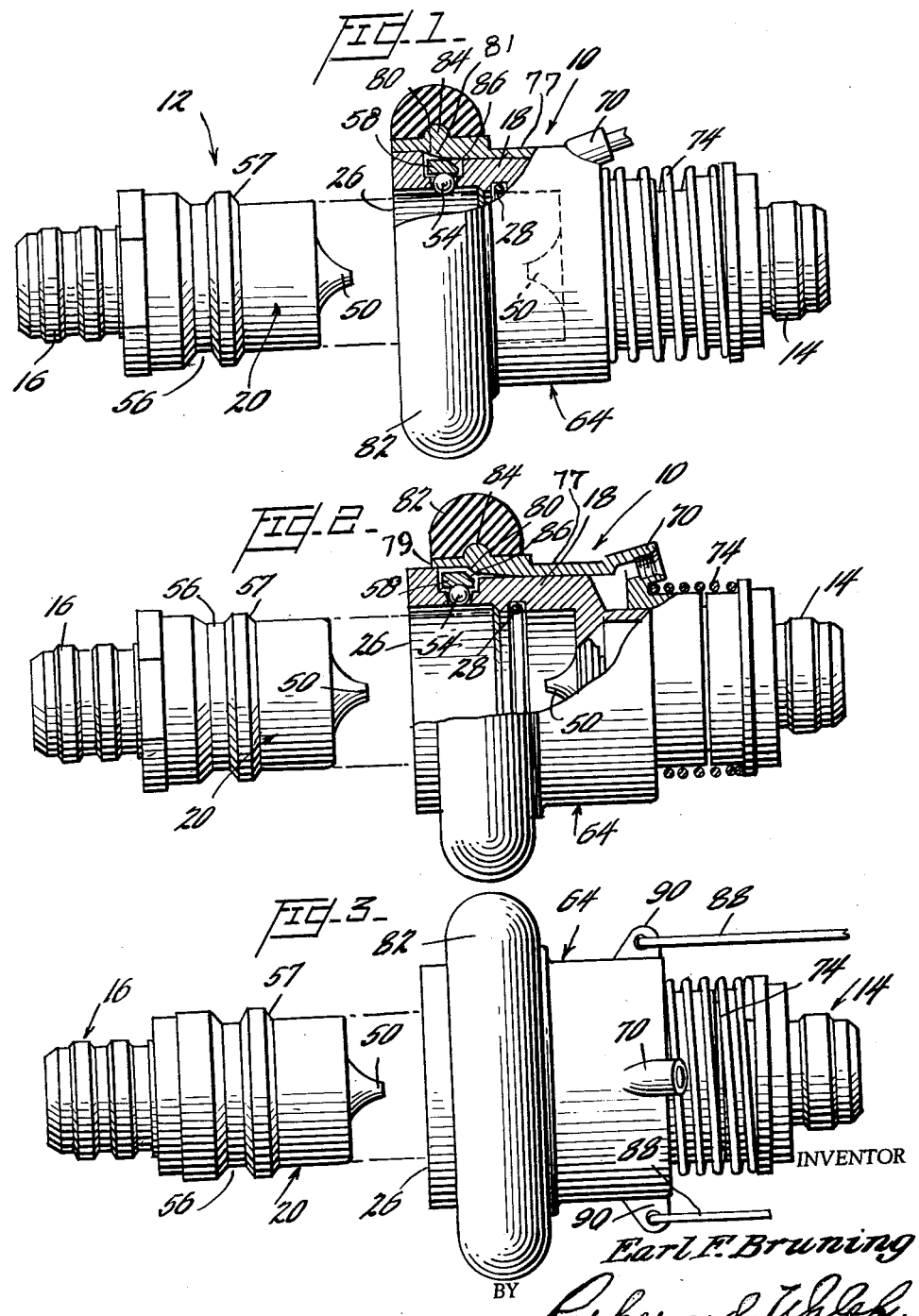

1

3,052,488
COUPLING WITH LOCKING BALL FOLLOWERS
Earl F. Bruning, 601 S. 9th St., Lincoln, Nebr.
Filed Dec. 13, 1957, Ser. No. 702,649
8 Claims. (Cl. 285—18)

This invention relates to a fluid coupling and more particularly to a fluid coupling of the type having valves which open automatically when the coupling parts are engaged and which close automatically when the coupling parts are disengaged. The invention is especially concerned with the locking means for holding the coupling parts together and which, when unlocked, releases the coupling parts for quick detachment.

In my prior patents, No. 2,512,999, issued June 27, 1950, and No. 2,666,656, issued January 19, 1954, I disclose fluid couplings of the foregoing general type wherein locking balls are utilized to retain the coupling parts in fluid coupling relationship. The couplings of my prior patents have been found to be highly advantageous within their respective fields of intended use. The aforesaid Patent No. 2,666,656, in particular discloses an arrangement whereby when a pull of a predetermined magnitude is exerted on one of the coupling parts the coupling is quickly separated, accompanied by automatic closing of the valves. The present invention provides an improved coupling in which the mating parts may be separated quickly and in response to the exertion of a predetermined constant force, even though the coupling may have been in use for some time. Moreover, the invention provides a coupling that is separable under the action of the pressure of a motive fluid and that can be positively separated by mechanical means in the event that the fluid pressure system fails. One use of such couplings is in the aircraft industry wherein fluids may be transferred between a ground station and a guided missile up until the instant that the missile is fired.

It is accordingly a principal object of the invention to provide an improved coupling having the aforementioned characteristics and concomitant advantages with respect to prior comparable devices.

Prior couplings, including those of my aforementioned patents, have a plurality of locking balls which move in apertures spaced around the circumference of a sleeve forming the female member of the coupling and which are adapted to enter corresponding recesses in the outer surface of a nipple which forms the male member of the coupling. The locking balls are held in the said recesses by a collar slidable on the sleeve and having a portion which moves into adjacency with the locking balls outwardly thereof so as to prevent outward displacement of the balls from the recesses in the nipple. To release the locking balls from the recesses in the nipple, the collar is moved to a second position in which the said collar portion moves away from the balls and allows the balls to move outwardly. To provide a positive lock and to ensure that the balls enter securely within the recesses, it is necessary that the inner surface of the collar engage the surface of the balls, and as the result of the contact of the balls with the collar in the course of the locking and unlocking operations and in resisting forces on the coupling parts tending to detach them, a peening or brinelling action is exerted by the balls on the collar. This deformation of the normally smooth surface of the collar tends to cause resistance to the movement of the collar, particularly during the unlocking operation, for if the parts of the coupling are under thrust stress when unlocking is called for, the balls may actually become seated in the depressions formed in the collar wall and offer substantial resistance to the movement of the collar. It then becomes necessary to exert an inordinate amount of force on the collar to release the coupling, and the operation of the coupling lock becomes irregular and unpredictable. It is accordingly a specific object of the present invention to eliminate the foregoing deficiencies.

These and other objects of the invention and the exact manner in which such objects are accomplished will become more readily apparent upon consideration of the following detailed description of the invention when taken in conjunction with the accompanying drawings wherein:

FIGURE 1 is a side view, partly in section, of the coupling parts of the invention shown with the parts separated but with the lock engaged;

FIGURE 2 is a view similar to FIGURE 1 with the lock shown disengaged;

FIGURE 3 is a plan view of the invention illustrated in FIGURES 1 and 2;

FIGURE 4 is an enlarged longitudinal sectional view illustrating the coupling with the parts connected and locked;

FIGURE 5 is a transverse sectional view taken along line 5—5 of FIGURE 4;

FIGURE 6 is a similar transverse sectional view illustrating the positions of the parts with the lock disengaged; and FIGURE 7 is a sectional view of a detail of the invention, taken along line 7—7 of FIGURE 5.

Briefly stated, the fluid coupling of the invention comprises a female coupling part having a sleeve and a male coupling part having a nipple adapted to be inserted axially within the sleeve. In a specific form of the invention, each of the coupling parts is provided with a valve which opens automatically when the parts are coupled and which closes automatically when the parts are uncoupled. Locking balls are provided in openings spaced around the circumference of the sleeve and are arranged to be received within corresponding recesses in the outer surface of the nipple as described previously. Arranged outwardly of the locking balls for movement therewith are a plurality of follower elements which are interposed between the balls and a locking collar slidable along the sleeve. The collar has a portion which moves into adjacency with the follower elements outwardly thereof, so as to prevent outward movement of the balls and follower elements sufficient to release the balls from their recesses. The said collar portion is movable away from the follower elements to release the same and the associated balls for outward movement, whereby the lock is disengaged. The complementary surfaces of the collar and the followers provide a smooth sliding contact. Any peening or brinelling action exerted by the balls on the followers is of no consequence, since the resulting deformation of the followers has no effect upon the aforesaid complementary surfaces. The force which must be exerted to move the collar along the sleeve thus remains constant. In the said specific form of the invention, a chamber is formed between end surfaces of the sleeve and collar for the admission of a fluid which moves the end surfaces apart so as to slide the collar along the sleeve and release the lock. This movement is resisted resiliently by a spring which exerts a biasing force upon the collar. An emergency release is provided by a lanyard which may be used to exert a positive unlocking force on the collar.

Referring to the drawings, the coupling of the invention comprises in its preferred form a female portion 10 and a male portion 12. The respective portions are provided with fittings 14, 16 which are adapted to connect the coupling parts to suitable conventional fluid conduits (not shown). As shown in FIGURE 4, fitting 14 is threaded into a sleeve 18, while fitting 16 is fitted into a sleeve 20 hereinafter referred to as a nipple. Fluid seals 22 and 24 in the form of O-rings are provided between the complementary surfaces of the fittings, the sleeve 18, and the nipple 20. The left-hand end of the sleeve 18 as shown in FIGURES 1, 2 and 3 has an opening 26 for the reception of the nipple 20, which is adapted to enter the sleeve axially. The left-hand portion of the sleeve is of large enough inside diameter to accommodate the nipple and fits the nipple snugly enough to provide just the clearance necessary for the insertion and removal of the nipple. Another O-ring 28 is held in a circumferential groove on the inner surface of the sleeve and forms a fluid seal between the sleeve and the nipple. The sleeve has an abutment wall 30 (FIGURE 4) which complements the end wall 32 of the nipple and limits the insertion of the nipple within the sleeve.

In the form shown, both the nipple and the sleeve are provided with valves 34, 36, respectively. Such valves are described in detail in my aforesaid prior patents. Each may comprise a tapered head 38 which mates with a tapered valve seat 40. An additional sealing ring (not shown) may be provided around the circumference of the head to form the actual fluid seal between the head and the seat, if desired. The valve head is attached to a valve stem 42 whch reciprocates within a guide 44 centered in the sleeve or nipple by a spider 46. See FIGURES 5 and 6. The valve head is biased against its valve seat by a return spring 48 which surrounds the guide 44 and has its ends abutting the spider 46 and the valve head 38. The valve head has a nose 50 which protrudes from the nipple or sleeve when the valve is closed. When the nipple is inserted within the sleeve, the protruding noses 50 engage each other and force the valve heads away from their seats. The valves then assume the positions illustrated in FIGURE 4 and provide a free fluid flow path through the fittings, the nipple, and the sleeve.

As shown in FIGURES 4, 5 and 6, the sleeve 18 is provided with a plurality of circumferentially spaced openings 52 in which a corresponding plurality of locking balls 54 are located. The relative diameters of the balls and their recesses are correlated so that portions of the balls may protrude into the interior of the sleeve, as shown in FIGURES 4 and 5, but the balls are prevented from dropping through the holes into the sleeve. While balls are preferred, other types of locking projections could be employed. The outer surface of the nipple 20 is provided with a circumferential groove 56 which forms a single recess for the reception of all the balls 54. Separate recesses could also be employed. As shown in FIGURE 4, at least the right wall of the groove 56 slopes outwardly toward the right end of the nipple so as to provide a surface which will cam the balls outwardly upon withdrawal of the nipple from the sleeve. The nipple also has an annular oppositely sloping shoulder wall 57 to the right of groove 56. This wall cams the balls outwardly upon insertion of the nipple. A complementary abutment wall may be formed on the inner surface of sleeve 18.

Located outwardly of the balls 54 are a plurality of follower elements 58. In the preferred form of the invention, the follower elements 58 form arcs of a circle (FIGURES 5 and 6). These elements are received within recesses in the outer surface of the sleeve 18, the recesses being constituted by a single circumferential groove 60 in the form shown. As indicated, the openings 52 for the balls 54 communicate with groove 60.

The inner surfaces of the follower elements which engage the balls may be cylindrical or may be curved so as to conform to the surface of the balls, but the outer surfaces are cylindrical or slightly conical so as to provide a smooth sliding contact with a locking collar to be described. In the embodiment illustrated, one follower element serves two balls. Circumferential movement of the follower elements is restrained by a series of spacer elements 62 shown in FIGURES 5, 6 and 7. The spacer elements may be constituted by pins inserted in the left-hand end of the sleeve 18 at points around its circumference and arranged parallel to the axis of the sleeve. Alternatively, the spacer elements could be constituted by radial walls dividing groove 60 into individual recesses. In the absence of the spacer elements, outward movement of the follower elements might increase the space between successive elements to such an extent that if successive follower elements moved circumferentially into abutting end to end relationship, a sufficiently large space might be formed between the first and last follower elements in the series as to allow one of the balls to escape therethrough.

A locking collar 64 surrounds sleeve 18 and the follower elements 58 and is arranged to slide along the outer surface of the sleeve. The locking collar has an annular transverse wall 66 located adjacent an annular shoulder 68 of sleeve 18. Surface 68 slopes away from surface 66 so as to provide a chamber therebetween for the reception of fluid which may be admitted through an inlet tube 70 formed integrally with the locking collar 64. Locking collar 64 has a cylindrical extension 72 to the right of wall 66 in FIGURE 4. This extension surrounds and is slidable upon the right end of sleeve 18. A coil spring 74 surrounds cylindrical extension 72 and has one end abutting wall 66 of the collar. The other end of the spring abuts an annular flange of a sleeve 76 which surrounds the right end of sleeve 18 and is held thereon by a flange 78 which may be integral with the fitting 14. The spring 74 biases the collar 64 toward the left end of the sleeve 18. In the form shown the inner surface of a portion 77 of collar 64 to the left of wall 6 is cylindrical and is of such diameter as to slide smoothly upon the opposed cylindrical outer surface of the portion of sleeve 18 between groove 60 and wall 68. The inner surface of the left end portion 79 of the collar 64 is cylindrical but of larger diameter, and the corresponding portion of sleeve 18 is cylindrical and enlarged accordingly to provide a smooth sliding contact. An intermediate portion of the inner surface of the collar is tapered as shown at 80 and may be followed by a very slightly tapered portion 81 (in which case the outer surface of the follower elements may be similarly tapered to provide a snug fit therewith). The collar may have a bumper 82 of rubber of similar material secured by a circumferential bead 84.

As shown in FIGURE 1, with the collar in its normal position, portion 81, which with portion 77 may be termed the portion of smaller inside diameter, is adjacent the follower elements 58 outwardly thereof, but as shown in FIGURE 2 if the collar is moved to the right against the bias of spring 74, the smaller diameter portion is moved away from the follower elements and is replaced by the larger diameter portion 79. The position illustrated in FIGURE 1, and also in FIGURE 4, is the locked position, in which the follower elements and the associated balls are held against outward movement by the collar. They position illustrated in FIGURE 2 is the unlocked position, in which the follower elements and the balls may move outwardly until the balls clear the inside of the sleeve 18.

Assuming that the parts are uncoupled, when the locking collar is moved to the right, the balls will be released for outward movement, and if the axis of sleeve 18 is horizontal, the balls on the lower side of the female coupling part will move outwardly under their own weight. The balls on the upper side will simply retain their positions under the influence of gravity. If the nipple is now inserted within the sleeve 18, the balls which still protrude within the sleeve 18 will be forced outwardly by the camming action of the sloping shoulder 57 of the nipple, and when the nipple is fully inserted (valves 34 and 36 being opened in the manner previously described), the balls on the upper side of the coupling will drop into the groove 56 under the influence of gravity. If the collar 64 is then released so as to allow it to move to the left under the influence of spring 74, or if it is physically moved to the left by an external force, the sloping portion 80 on the inside surface of the collar will engage the right end of the follower elements, which end is preferably tapered as shown at 86 so as to conform to the slope of collar portion 80, and the collar will cam the follower elements inwardly until all of them assume the positions illustrated in FIGURES 1 and 4. Inward movement of the follower elements is, of course, accompanied by inward movement of the locking balls 54 into the groove 56. The coupling parts will now be firmly locked together, and fluid may flow from the conduit connected to one coupling part, through the coupling, to the conduit connected to the other coupling part.

When it is desired to release the lock, so that the nipple may be withdrawn, motive fluid, which may be compressed air, is forced through pipe 70 into the chamber between the end walls 66 and 68 of the collar and sleeve, respectively. This fluid may be supplied from a convenient source of fluid under pressure (not shown). The fluid pressure causes the collar to move to the right relative to sleeve 18, and the chamber expands axially of the coupling until the parts assume the positions illustrated in FIGURE 2. The nipple may now be withdrawn, the sloping right wall of the groove 56 in the nipple camming the ball 54 outwardly along with the follower elements 58. As the nipple is withdrawn, the valves close in a manner opposite to the opening described previously.

In the event that the supply for providing motive fluid to the pipe 70 should fail, it is desirable to have some positive emergency means for releasing the coupling. As shown in FIGURE 3, this may be accomplished by attaching a lanyard 88 to ears 90 which may be formed integrally with the locking collar 64. A yank on the lanyard will move the locking collar to the right and will thus release the nipple for withdrawal.

It is important to note that if the locking balls 54 exert a peening or brinelling action on the follower elements 58, the resulting deformation of the follower elements will be on their inner surfaces adjacent the balls. The outer surfaces of the elements will be unaffected, and hence the smooth, sliding contact of the collar on the follower elements will be maintained. The result is that the amount of force which must be exterted to move the collar and release the lock will remain essentially constant even though the coupling is subjected to long and vigorous use. The operation of the coupling then becomes dependable and predictable.

While a preferred form of the invention has been shown and described, it will be apparent to those skilled in the art that modifications can be made without departing from the principles and spirit of the invention, the scope of which is defined in the appended claims. Accordingly, the foregoing form is to be taken as exemplary rather than restrictive, and those modifications which come within the meaning and range of equivalency of the claims are included therein.

I claim:
1. A fluid coupling comprising a sleeve, a nipple adapted to enter an end of said sleeve into fluid coupling relationship with said sleeve, said sleeve having a plurality of circumferentially spaced apertures, locking projections located in said apertures and retractable radially outwardly beyond the inner wall of said sleeve and projectable radially inwardly of the inner wall of said sleeve, said projections having the shape of solids of revolution and being mounted to rotate at least along axes parallel to the axis of the coupling, said nipple having a recessed portion on its external circumference for receiving said projections in their projected position to lock the nipple in the sleeve, a follower element within said sleeve, located radially outward of and encompassing said projections and movable radially inwardly to insure projection of said projections and outwardly to permit retraction of said projections while being prevented from substantial revolving movement with respect to said sleeve, and a locking collar on said sleeve, said collar having a first portion with a radial dimension radially outward of said follower and having a second portion with a radial dimension larger than said first radial dimension, said collar being slidable axially along said sleeve between a locking position wherein the first portion of the collar is in close positive engagement with said follower to prevent outward displacement of said follower and an unlocking position wherein the second portion of the collar is in loose engagement with said follower to permit limited radially outward movement of said follower to release said follower and in turn said projections from locking engagement with said nipple.

2. A fluid coupling comprising a sleeve, a nipple adapted to enter an end of said sleeve into fluid coupling relationship with said sleeve, said sleeve having a plurality of circumferentially spaced apertures, locking balls located in said apertures and retractable radially outwardly beyond the inner wall of said sleeve and projectable radially inwardly of the inner wall of said sleeve, said nipple having a recessed portion on its external circumference for receiving said balls in their projected position to lock the nipple in the sleeve, a follower element within said sleeve, located radially outward of and encompassing said balls and movable radially inwardly to insure projection of said balls and outwardly to permit retraction of said balls while being prevented from substantial revolving movement with respect to said sleeve, and a locking collar on said sleeve, said collar having a first portion with a radial dimension radially outward of said follower and having a second portion with a radial dimension larger than said first radial dimension, said collar being slidable axially along said sleeve between a locking position wherein the first portion of the collar is in close positive engagement with said follower to prevent outward displacement of said follower and an unlocking position wherein the second portion of the collar is in loose engagement with said follower to permit limited radially outward movement of said follower to release said follower and in turn said balls from locking engagement with said nipple.

3. The coupling of claim 2, said follower elements being arcuate and extending around the circumference of said sleeve in corresponding recesses.

4. The coupling of claim 3, said sleeve having spacers extending between successive follower elements to restrict their circumferential movement.

5. The coupling of claim 2, further comprising a spring biasing said locking collar to said locking position.

6. The coupling of claim 2, further comprising fluid operated means for moving said collar to said unlocking position, and mechanically operated means for so moving said collar.

7. The coupling of claim 2, said collar and said sleeve having complementary end wall portions spaced to form a chamber for the reception of a motive fluid, and means for admitting said fluid to said chamber to move said collar relative to said sleeve, whereby said nipple is unlocked.

8. The coupling of claim 2 wherein the two portions of the collar having differing radial dimensions are connected by another portion smoothly tapering from one dimension to the other and wherein a portion of the periphery of the follower elements is tapered correspondingly so as to provide complementary sliding surfaces on said collar and said followers.

(References on following page)

References Cited in the file of this patent

UNITED STATES PATENTS

| | | |
|---|---|---|
| 651,706 | Forbes | June 12, 1900 |
| 1,534,173 | Fogelberg | Apr. 21, 1925 |
| 2,279,146 | Schneller | Apr. 7, 1942 |
| 2,438,672 | Margrave | Mar. 30, 1948 |
| 2,452,430 | Clark | Oct. 26, 1948 |
| 2,689,143 | Scheiwer | Sept. 14, 1954 |
| 2,727,761 | Elliott | Dec. 20, 1955 |
| 2,744,770 | Davidson et al. | May 8, 1956 |
| 2,750,209 | Robb | June 12, 1956 |
| 2,752,801 | Olson | July 3, 1956 |
| 2,837,352 | Wurzburger | June 3, 1958 |
| 2,850,298 | Clark | Sept. 2, 1958 |
| 2,921,436 | Canner | Jan. 19, 1960 |
| 2,930,633 | Ethington | Mar. 29, 1960 |